June 28, 1960      G. N. GALE      2,942,368
DISPLAY DEVICE

Filed Nov. 3, 1958      3 Sheets-Sheet 1

INVENTOR.
George N. Gale
BY Michael S. Striker
Attorney

June 28, 1960 G. N. GALE 2,942,368
DISPLAY DEVICE

Filed Nov. 3, 1958 3 Sheets-Sheet 2

INVENTOR.
BY George N. Gale
Michael S. Striker
Attorney

June 28, 1960

G. N. GALE 2,942,368

DISPLAY DEVICE

Filed Nov. 3, 1958

INVENTOR.
George N. Gale
BY
Michael S. Striker
Attorney

United States Patent Office 2,942,368
Patented June 28, 1960

2,942,368
DISPLAY DEVICE
George N. Gale, 120 Pelham Road, New Rochelle, N.Y.
Filed Nov. 3, 1958, Ser. No. 771,257
5 Claims. (Cl. 40—158)

The present invention relates to display devices.

More particularly, the present invention relates to devices for displaying tearsheets, reprints, tabloid prints, and the like.

At the present time, conventional devices used for displaying such material have several drawbacks. Where the display device is designed so that one display sheet may be exchanged for another, the display device has a door which can be opened to remove one display sheet and replace it with another, and this door can only be retained in its closed position, by the use of turnable closure devices and the like, located at the rear of the display device and undesirably complicating the structure of the device as well as the ease with which display sheets may be changed. The term "display sheets" is intended to refer to tearsheets, reprints, tabloid prints, and the like.

Moreover, display devices of this type have the disadvantage of making obvious the fact that the particular display sheet is removably mounted and can be exchanged for another display sheet. In order to overcome this latter disadvantage, so-called laminated plaques are used. These plaques are made up of a suitable backing board on which the display sheet is placed, and then a sheet of transparent plastic is placed over the display sheet and the exposed front peripheral face portion of the backing board which surrounds the display sheet. Then, with heat and pressure, the transparent plastic sheet is fused to the display sheet and the peripheral portion of the front face of the backing board to provide a display device having a smooth glossy front surface which is continuous and which gives the illusion of a single sheet especially prepared for the display. The disadvantage of such laminated plaques is, on the one hand, their relatively high cost resulting from the fact that they can be used only once with any given display sheet and, on the other hand, the fact that the color of the print on the display sheet fades and changes in an uncontrollable manner as a result of the heat applied for joining the plastic sheet to the backing board of the laminated plaque. Where fabric sheets are placed between the transparent sheet and the backing board, the yarns of the fabric are damaged upon applying heat to the plastic sheet.

One of the objects of the present invention is to provide a display device capable of changing one display sheet for another and at the same time having the same exterior appearance as a laminated plaque.

Another object of the present invention is to provide a display device having a door for opening and closing the device to enable one display sheet to be exchanged for another, this door being capable of remaining in its closed position without the use of any turnable closure members or the like.

It is also an object of the present invention to provide a display device removably supporting a display sheet and at the same time presenting a continuous glossy exterior visible front surface giving the illusion of a single photograph or the like of which the display sheet forms a part.

The objects of the present invention also include the provision of a process for providing a display board with a door in such a way that the door will reliably remain in its closed position solely by frictional contact with the remainer of the display board.

With the above objects in view, the present invention includes in a display device a display board formed with a slit passing therethrough along three sides of a rectangle and with a scoreline passing partly therethrough along the fourth side of the rectangle so as to provide the display board with a turnable door. The scoreline extends into the display board from the front face thereof and the door frictionally engages the remainder of the display board, when the door is in a closed position in the same plane as the remainder of the display board, with a force of friction sufficient to retain the door in its closed position without the use of any closure devices and over a long period of time after repeated closing and opening of the door. A transparent sheet is located in front of and covers the front face of the display board, and a layer of opaque material is located between the transparent sheet and the front face of the display board, this layer of opaque material being joined to the front face of the display board along a portion thereof surrounding the door and being joined to the rear surface of the transparent sheet which is directed toward the front face of the display board. The layer of opaque material extends inwardly beyond the edge of the door so that the door edge is not visible through the transparent sheet, and this layer of opaque material defines an area of the transparent sheet through which a display sheet located between and against the door and the transparent sheet is visible.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 4D:
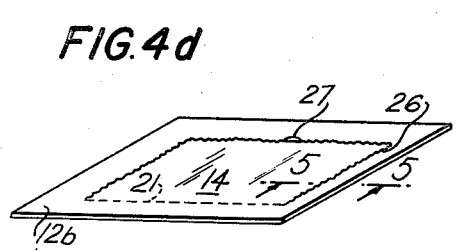
Figure 4C:
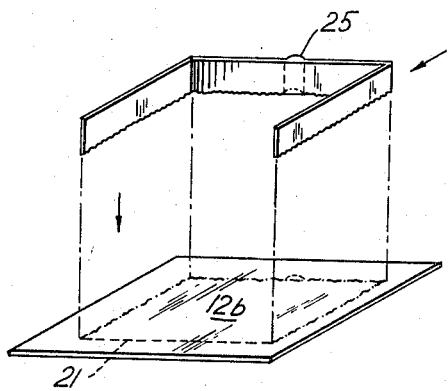
Figure 5:
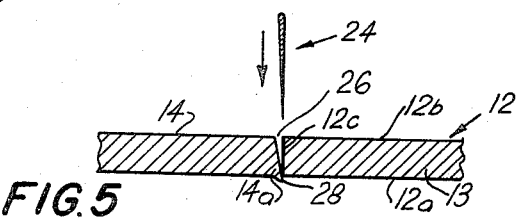
Figure 6:
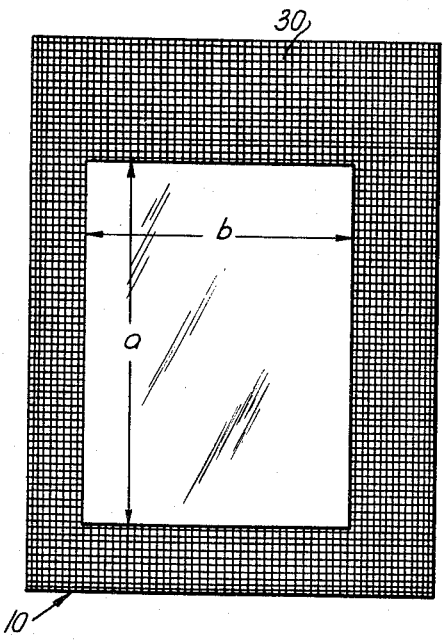
Figure 7:
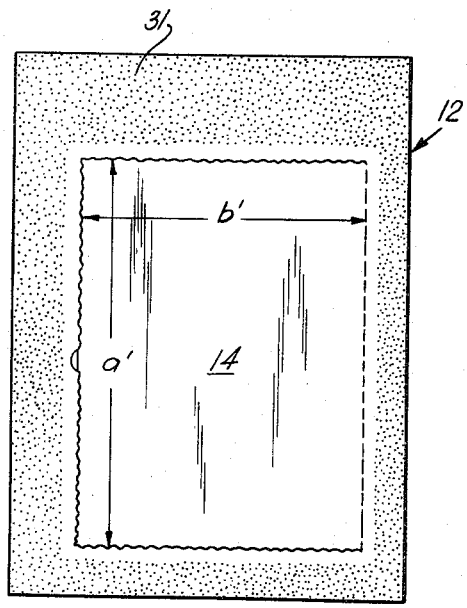
Figure 8:
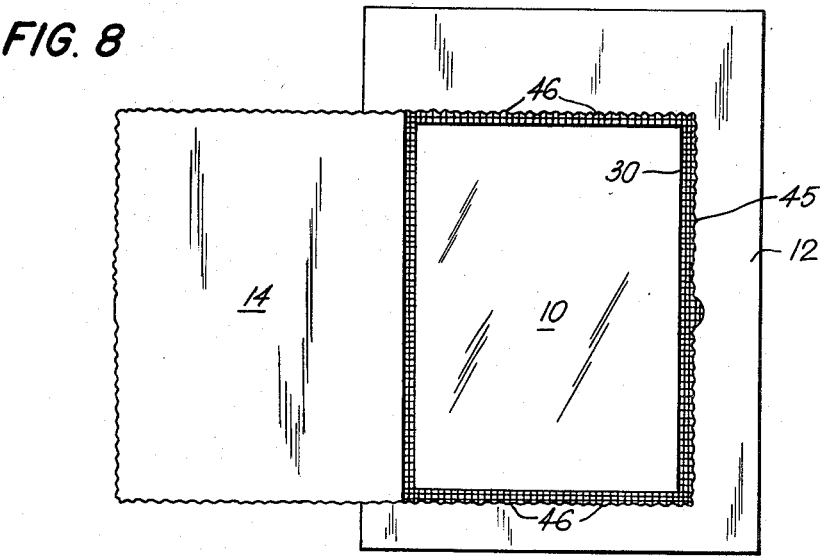
Figure 9:
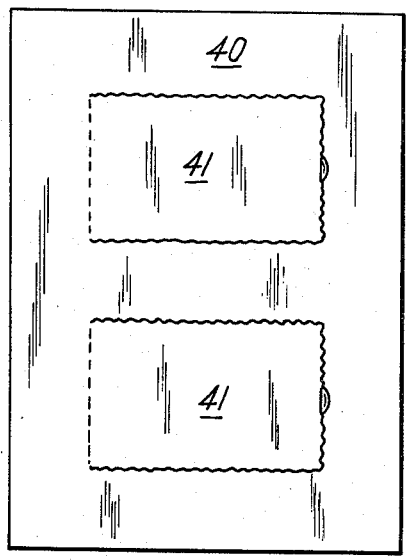
Figure 10:
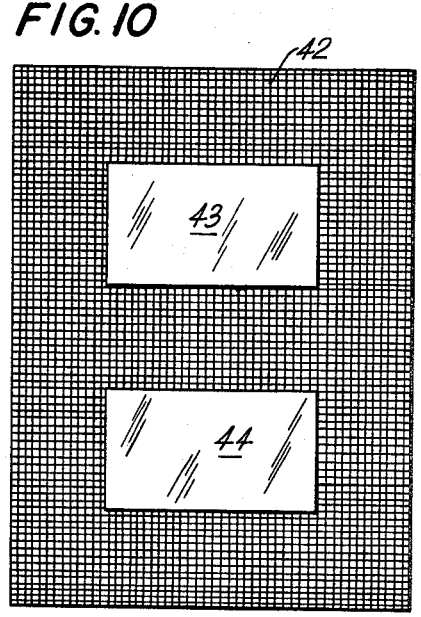

Figs. 4a–4d diagrammatically illustrate a process according to the present invention for providing a display board with a door;

Fig. 5 is a fragmentary sectional view taken along line 5—5 of Fig. 4d in the direction of the arrows;

Fig. 6 shows a transparent sheet forming part of the display device, this transparent sheet being shown in Fig. 6 as it appears when looking toward the rear surface of the sheet and being shown provided with a layer of opaque material;

Fig. 7 shows the display board before the transparent sheet of Fig. 6 is applied thereto, Fig. 7 also showing a layer of adhesive provided on the display board for joining the sheet of Fig. 6 thereto;

Fig. 8 shows the display device of the invention in the finished condition as it appears from the rear with the door open;

Fig. 9 shows another embodiment of a display device according to the present invention as seen from the rear; and Fig. 10 shows the display device of Fig. 9 as it appears from the front.

Figure 1:
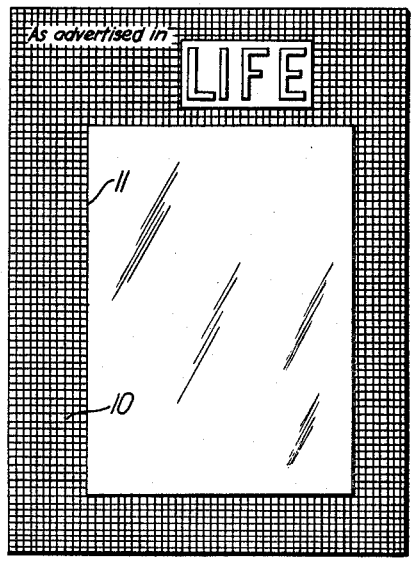
Fig. 1 illustrates the appearance of the display device of the invention as seen from the front.
Figure 2:
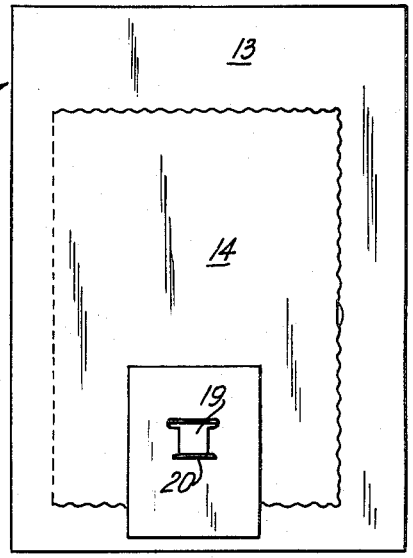
Fig. 2 shows the display device of the present invention as seen from the rear.
Figure 4A:
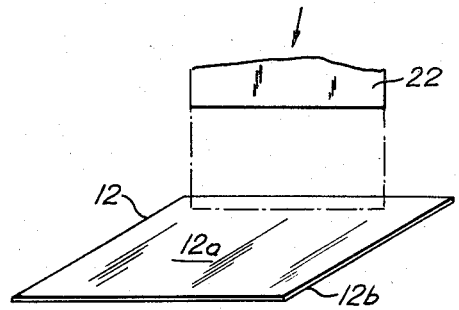
Figure 4B:
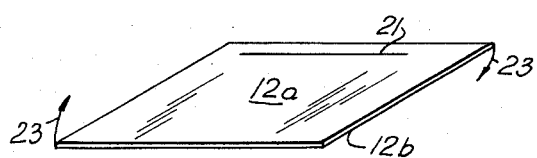
Figure 3:
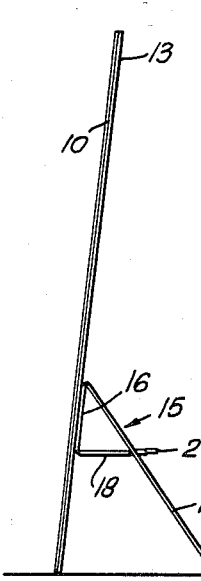
Fig. 3 is a side elevation of the display device of Figs. 1 and 2 as seen from the right side of Fig. 1.

Referring now to Figs. 1–3, the display device of the present invention is provided at its front face with a sheet of clear transparent plastic 10. Although any of the well known available clear transparent plastic sheets may be used for this purpose, such as sheets made of vinyl or acetate resins, it is preferred to use polystyrene because it is fairly inexpensive, because it has a high gloss and because no difficulties are encountered in the application of coloring materials thereto. When looking at the front of the device, as it appears in Fig. 1, the area from the outer peripheral edge of the device up to the rectangle 11, shown in Fig. 1, is opaque and of any desired color, and any suitable printed matter may be provided in this opaque area, as indicated at the upper part of Fig. 1. When looking toward the rear of the device, as shown in Fig. 2, a display board 12 is seen, this display board 12 carrying the sheet 10 at the front face of the display board. The display board 12 has an endless outer peripheral portion 13 surrounding a door 14 formed from the display board itself, and this door 14 may be opened and closed for changing a display sheet. The display sheet is located between and in engagement with the door 14 at the front face of the latter and the sheet 10 at the rear face of the latter so that the display sheet is visible through the clear transparent portion of sheet 10 bounded by the rectangle 11.

Any suitable collapsible support 15 may be carried by the door 14 at its rear face for supporting the display device in the manner indicated in Fig. 3. In the illustrated example, the support 15 has an intermediate portion 16 glued to the rear face of the door 14, and the support 15 includes portions 17 and 18 respectively connected to and turnable with respect to the intermediate portion 16, the device 15 being in the form of a single strip of cardboard having scorelines at the junctions between parts 17 and 18 with the intermediate portion 16, respectively. The portion 17 formed with a keyhole slot 19, and the portion 18 terminates in an enlarged head end 20 which may be passed through the upper widest part of the keyhole slot 19 as viewed in Fig. 2, to set the display device up or to take the same down.

In accordance with the present invention, the door 14 is formed in the display board 12 in a special way. The display board itself is in the form of a sheet of relatively heavy, stiff cardboard and is known in the trade as "display board." The process for providing the display board with a door is illustrated in Figs. 4a–4d. In this process, the display board 12 is provided with a scoreline 21 extending along one side of a rectangle by any suitable tool such as the blade 22 diagrammatically indicated in Fig. 4a. This blade moves toward the display board 12 from the front face 12a thereof toward the rear face 12b thereof, and the stroke of the blade 22 terminates short of the rear face 12b so as to provide the display board with the straight scoreline 21 shown in Fig. 4b. Then, as is indicated by the arrows 23, the display board is turned around so that its rear face 12b is exposed to a cutting tool 24 diagrammatically shown in Fig. 4c, this cutting tool having a wavy cutting edge arranged along three sides of a rectangle and including a suitable punching tool 25 which forms part of the cutting tool assembly. This tool 24 is moved in the manner diagrammatically indicated in Fig. 4c so as to provide the slit 26 in the display board 12 as illustrated in Fig. 4d. This slit is wavy and extends along the three sides of the rectangle shown in Fig. 4d, and it will be noted that the scoreline 21 extends along the fourth side of this rectangle. The punch 25 as well as the cutting blade 24 pass completely through the board 12 so that the slit 26 extends completely through the board 12 and the punch 25 leaves a notch 27 in the board 12.

It will be noted that this process requires at least two steps since it is necessary to cut the scoreline from the front face of the display board and the slit 26 from the rear face of the display board, so that it becomes necessary to reverse the position of the display board between the two cutting operations. Of course, the slit 26 and the notch 27 could be formed in the display board before the scoreline 21, if desired. Also with a special arrangement of the cutting blades, it is conceivably possible that the blade 22 and the tool 24 could simultaneously advance into the display board from the opposed faces thereof, but a machine for accomplishing this result would be quite expensive. Although the process of the invention requires cutting the display board from its opposed faces and this is somewhat more expensive than cutting the display board from the same face, the added expense and possible inconvenience results in a board whose door will remain closed without the use of any additional devices. No tabs or turnable closure members or the like are required at the rear of the display device of the invention to maintain the door 14 in its closed position where it is in the same plane as the remainder of the display board. If the blade 24 were combined with the blade 22, and the door were formed in one operation simply by cutting into the display board from its front face, the result would be a door which would very easily open and which would require additional structure for maintaining it in its closed position. By forming the slit 26 with the movement of the cutting tool through the display board from the rear toward the front face thereof the outer edge of the door 14 has sufficient frictional contact with the remainder of the display board to be reliably maintained in its closed position solely as a result of friction, so that no further closure devices are necessary. As is indicated on an enlarged scale in Fig. 5, by moving the cutting tool 24 from the rear face 12b toward the front face 12a of the display board, the door 14 is provided along its outer edge with a burr 28 which greatly increases the frictional contact of the door with the rest of the display board and maintains the door in its closed position. If the burr were located at the rear face of the board, it would be exposed at this rear face and could not keep the door closed. Moreover, the cutting blade 24 is extremely thin having near its cutting edge a thickness of approximately 0.028" and the bevel of the cutting edge is on the inner side of the blade. As a result practically no board material is removed by the blade and the slit 26 extends through the board as shown to an exaggerated degree in Fig. 5. This will result in the edge portion 12c of board 12 at slit 26 being located in the path of movement of edge portion 14a of the door 14 when the latter is opened and closed, so that the door will remain closed. It has been found that the door 14 can be opened and closed well over a 1,000 times while reliably remaining shut each time it is closed if the door is constructed according to the present invention.

After the display board has been provided with the door 14, the sheet 10 is joined to the front face of the display board in the manner shown in Figs. 6 and 7. The rear surface of the sheet 10 is shown in Fig. 6, and before the sheet 10 is joined to the display board, a layer of opaque coloring material 30 is deposited on the rear face of the sheet 10 in the manner indicated in Fig. 6, this coloring material being any suitable paint or ink deposited on the sheet 10 in the manner used in silk screen printing, for example, so as to leave a rectangle of the length $a$ and the width $b$ surrounded by the layer 30. The coloring material 30 adheres directly to the rear face of the sheet 10.

The front face of the display board 12 is visible in Fig. 7 and a layer of any suitable adhesive 31 is deposited on the front face over the area thereof indicated in Fig. 7 also, for example, by a silk screen printing method. It will be noted that the area of the adhesive 31 terminates short of the door 14 so that if the adhesive 31 should spread during pressing of the sheet 10 against the display board, the adhesive will not reach the door 14. The outer dimensions of the sheet 10 before it is joined to the door 12 are somewhat greater than the outer dimensions of the board 12. It will be noted from Fig. 7 that the door 14 as a length $a'$ and a width $b'$ greater than the length $a$ and width $b$ of the exposed rectangle of the sheet 10, respectively, and when the sheet 10 is turned over from the position of Fig. 6 and placed on top of the board 12 of Fig. 7 to be joined with the latter by the adhesive 31, the exposed rectangle of the sheet 10 is centered with respect to the door 14, by the use of any suitable jugs, for example, so that the outer periphery of the door 14 will be covered by the layer of opaque material 30 and will not be visible through the front of the display board.

After the sheet 10 has been joined in this manner to the board 12 with the application of suitable pressure the entire assembly is trimmed so that the outer edges of the sheet 10 are exactly flush with the outer edges of the board 12 and any adhesive material or coloring material which bleeds to the outer edge of the board 12 during the application of the pressure is simultaneously trimmed off so as to leave a smooth clean edge on the finished display board. Thereafter, the support 15 may have its portion 16 joined to the rear exposed surface of the door 14 by any suitable glue or the like, and the device is complete.

The device is shown in Fig. 8 as it appears from the rear with the door 14 open, and it will be noted that the inner peripheral portion of the coloring material 30 is visible through the door 14.

The tearsheet, reprint or other display sheet, is placed against the sheet 10 at the rear face thereof when the door 14 is in the open position shown in Fig. 8, and then the door 14 is closed so as to be located against the rear surface of the display sheet. There is a tendency for the display sheet to adhere to the surface of the sheet 10 as a result of static electricity. When the device is viewed from the front, as shown in Fig. 1, the illusion is given of a single continuous sheet manufactured especially for display purposes, and having all of the advantages of a laminated plaque without any of the disadvantages of the latter such as the possibility of damaging the colors of the display sheet and the lack of any possibility of exchanging one display sheet for another.

It will be noted that the door 14 has a wavy edge. This wavy edge is considered superior to a straight edge since it increases the area of frictional contact between the edge of the door 14 and the remainder of the display board and since it provides projections similar to teeth received in suitable notches, so that the reliability of the closing of the door is increased by the use of wavy edges.

As may be seen from Fig. 8 the vertical right side edge 45 of the door opening acts to a degree greater than its top and bottom edges to retain the door closed. By providing a wavy edge, the portions 46 of the wavy top and bottom edges extend in substantially the same direction as edge 45 and thus also participate in holding the door closed. The door can be opened very simply by engaging the edge thereof at the notch 27.

Of course, the invention is not limited to a display device having a single door. For example, as indicated in Figs. 9 and 10, the display device of the invention may include a display board 40 having a pair of doors 41 located one above the other and formed in the same way as the door 14 although being smaller. Also, the transparent plastic sheet 42 has the coloring material deposited on its rear face from the outer edges of the sheet 42 all the way up to the rectangles 43 and 44 which are somewhat smaller than and aligned with the doors 41 so that the edges of these doors are not visible through the front of the sheet 42. With this arrangement, it is possible, for example, to locate behind the upper rectangle 43 a sheet indicating a particular item and behind the lower rectangle 44 a sheet indicating the price of the item, and should the price change, it is only necessary to replace the lower sheet. Of course, the board 40 is provided at a convenient part of its rear surface with a support similar to the support 15. For example, the lower door 41 of Fig. 9 may have such a support joined thereto.

It will be understood that each of the elements described above, or two or more together, may also find a useful application in other types of display devices differing from the types described above.

While the invention has been illustrated and described as embodied in interchangeable display devices, it is not intended to be limited to the details shown, since various modifications and structural changes may be made without departing in any way from the spirit of the present invention.

Without further analysis, the forgoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A display device comprising, in combination, a display board having front and rear faces and being formed with a slit extending therethrough along three sides of a rectangle and with a scoreline extending therethrough from the front toward but terminating short of the rear face thereof along the fourth side of the rectangle to provide the display board with a door turnable along said scoreline rearwardly away from and forwardly toward a closed position where said door is in the same plane as the remainder of the display board; a glossy transparent plastic sheet located in front of said display board covering at least said door when it is in its closed position and having a rear face directed toward said door; and a covering layer of opaque material applied to the rear face of said transparent sheet extending inwardly beyond the outer edge of the door when the latter is in its closed position and defining an area of the transparent sheet through which a display sheet located between and engaging said door and transparent sheet is visible.

2. A display device as recited in claim 1 and where said transparent sheet is made of polystyrene.

3. A display device comprising, in combination, a display board having front and rear faces and being formed with a plurality of scorelines extending into the display board from the front face thereof and respectively extending along one side of a plurality of rectangles, said display board being formed with a plurality of slits passing therethrough along the remaining sides of said rectangles so that said board is provided with a plurality of doors turnable at said scorelines, said doors being maintained in a closed position in the same plane as the remainder of the display board solely by frictional engagement therewith; a glossy transparent plastic sheet covering the front face of the display board; and a coating of opaque material located between and applied to the rear face of the transparent sheet and the front face of the display board, said opaque material overlapping the edges of the doors and leaving exposed transparent areas of said sheet through which display sheets located in the front of said doors are visible.

4. A display device comprising, in combination, a display board having a front face and formed with an opening; a thin glossy transparent plastic sheet covering the front face of the display board; a coating of opaque material located between and applied to said transparent sheet and the front face of the display board, said coating extending beyond the edge of said opening so that the edge of the opening is invisible through said transparent sheet; and means carried by the display board and invisible from the front thereof for holding against said transparent sheet in said opening a sheet which is to be displayed and which has a periphery overlapping said coating.

5. A display device comprising, in combination, a display board having a front face and formed with an opening; a thin glossy transparent plastic sheet located in front of said display board covering and extending beyond said opening therein, and having a rear face directed toward said opening; a covering layer of opaque material applied to the rear face of said transparent sheet extending inwardly beyond the edge of said opening so that the edge of the opening is invisible through said transparent sheet; and means carried by the display board and invisible from the front thereof for holding against said transparent sheet in said opening a sheet which is to be displayed and which has a periphery overlapping said covering layer applied to said transparent sheet.

References Cited in the file of this patent
UNITED STATES PATENTS

| | | |
|---|---|---|
| 554,171 | Cushman | Feb. 4, 1896 |
| 1,807,288 | Herbert | May 26, 1931 |
| 2,177,405 | Cross | Oct. 24, 1939 |
| 2,380,076 | Scheyer | July 10, 1945 |